United States Patent [19]

Braitsch et al.

[11] Patent Number: 4,500,037
[45] Date of Patent: Feb. 19, 1985

[54] RAILWAY ROAD BED

[75] Inventors: Hans Braitsch, Bergisch-Gladbach; Hermann Ortwein; Josef Vorwald, both of Cologne, all of Fed. Rep. of Germany

[73] Assignee: Clouth Gummiwerke Aktiengesellschaft, Cologne, Fed. Rep. of Germany

[21] Appl. No.: 383,157

[22] Filed: May 28, 1982

[30] Foreign Application Priority Data

Jun. 3, 1981 [DE] Fed. Rep. of Germany ....... 3121946

[51] Int. Cl.³ .................... E01B 2/00; E01B 19/00; E01C 3/00
[52] U.S. Cl. ........................................ 238/2; 238/382
[58] Field of Search ............................ 238/1, 2, 382

[56] References Cited

U.S. PATENT DOCUMENTS

| 2,420,833 | 5/1947 | Monroe | 238/2 |
| 3,587,964 | 6/1971 | Cork | 238/2 |
| 4,235,371 | 11/1980 | Kohler | 238/382 |
| 4,266,719 | 5/1981 | Ortwein et al. | 238/382 |

FOREIGN PATENT DOCUMENTS 2947844  6/1981  Fed. Rep. of Germany .......... 238/2

Primary Examiner—Howard Beltran
Attorney, Agent, or Firm—Karl F. Ross; Herbert Dubno

[57] ABSTRACT

A railroad bed has an elastomeric mat which supports the ballast and on which the sleepers and rails are mounted. The mat has an upper surface formed by a metal or plastic sheet which prevents penetration of the ballast into the elastomeric body.

11 Claims, 5 Drawing Figures

RAILWAY ROAD BED

FIELD OF THE INVENTION

Our present invention relates to a bedding mat for a rail bed along a railroad right-of-way.

BACKGROUND OF THE INVENTION

In general, a railroad track comprises a pair of rails which are secured to ties or sleepers extending transversely of these rails anchored somewhat yieldably in a bed of ballast generally formed by gravel and disposed along the railroad right-of-way.

This ballast bed is generally provided upon a graded and compacted surface or even upon a concrete platform.

With increasing desire for quiet travel and because of the limited yieldability of the gravel ballast, efforts have been made to increase the resiliency of the bed by providing mats of elastic material between the ballast and the support surface. These cushioning mats can be comprised of elastomeric material and especially from reclaimed rubber and have, in the past, been constituted by one or more layers of foam material or from rubber strips ensheathed in reclaimed rubber granules which are adhesively secured to the core.

Such rubber cushioning layers have greatly improved the resiliency of the bedding for the track and have served as effective noise-damping levels in tunnels or elsewhere along the right-of-way where noise problems are pronounced.

However, these systems do have the disadvantage that a relatively sharp-edged gravel ballast penetrates into the mat in a fairly short time, damaging the latter and/or markedly reducing its elasticity.

As the mats tend to be penetrated by the ballast, they become more and more rigid and hence less and less able to serve as vibration-damping or sound-damping members.

Another important disadvantage of these earlier mats is that they tend to shift laterally or longitudinally in the direction of horizontal forces which are generated as the ballast is pressed downwardly against the mats.

As a result of this shifting, on one side the ballast may be directly in contact with the support surface while on the opposite side the ballast may be supported by the cushioning layers.

The locations at which the ballast is no longer supported by the shifted cushioning layers, the sound-damping effect is markedly reduced and the noise generated may become excessive.

Another disadvantage of the earlier bedding mats is that, especially when the ballast is constituted by large rocks and perimetal-shaped members, there is a tendency for the tremendous pressures applied in the vertical direction to drive these ballast-forming members through the mats and form bridges of the ballast material which create sound-transmitting paths avoiding the sound-damping effects described above.

OBJECTS OF THE INVENTION

It is, therefore, the principal object of the present invention to provide an improved bed for the sleepers or ties of a railroad track whereby these disadvantages are avoided.

Another object of the invention is to provide an improved sound-damping mat for a sleeper bed of the type described.

Still another object of the invention is to solve the problem of mat penetration by sharp-edged ballast which has heretofore confronted the field of railroad bed design.

It is also an object of this invention to provide an improved mat assembly for the purposes described which will have an especially long useful life.

SUMMARY OF THE INVENTION

These objects and others which will become apparent hereinafter are attained, in accordance with the present invention, in a system wherein at least one yieldable and preferably elastomeric mat is provided below at least a layer of sleeper-anchoring ballast on a railroad bed or right-of-way. This mat has an upper surface supporting the layer of ballast, generally in the form of discrete stone bodies, which surface is provided with a metallic layer or another layer of sheet material whose hardness precludes the penetration of the gravel therethrough and whose yieldability, elasticity or resilience is sufficient to allow for elastic compression of the mat.

While this layer can be of any material capable of performing the indicated functions of transmitting elastic movement and preventing the penetration by the ballast, it is preferably composed of metal or synthetic resin material, the metal sheet gravel being secured by an adhesive or by vulcanizing to the elastomeric body while the synthetic resin layer is secured to this body by thermal or ultrasonic welding, vulcanization or adhesive bonding.

The penetration-blocking yieldable sheet precludes penetration of the ballast into the mat and also serves advantageously to distribute the load over the entire surface of the mat.

The useful life of the mat is thereby markedly increased and, surprisingly, the sheet tends to eliminate the tendency for the mat to migrate horizontally without requiring the mat to be bonded to the supporting surface. The latter effect is especially surprising since one would scarcely have believed that an elastically deformable layer upon the mat, which is sufficient to prevent penetration by the ballast, also is capable of preventing shifting.

According to a feature of the invention, the sheet is profiled so that it has surfaces inclined to the horizontal direction and to horizontal surfaces. This use of inclined surfaces has found to limit or prevent shifting of the ballast upon the mat. The surfaces tend to change the compression forces into shear components which has been found to be of advantage in providing improved sound-damping as well.

It has also been found to be advantageous to provide means for limiting the relative displacement of the ballast and the metal or plastic sheet overlying the elastomeric body of the mat in the form of a covering on this sheet which has a high coefficient of sliding friction. Such a covering may be composed of rubber and can be bonded to the sheet.

It has been found to be advantageous to form the elastomeric body of the mat of at least two juxtaposed plates or slabs of elastomeric material preferably with interfitting formations.

Most advantageously, these interfitting formations of the two elastomeric slabs are constructed and arranged so that they define cells, cavities or spaces (hollows)

between them. Furthermore, the formations can be designed so that they also can transform compressive forces into shear forces between the slabs. Thus the formations may have flanks which are inclined to the vertical and which bear upon one another.

These formations also have the advantage that they increase the resiliency or elasticity of the body because the large hollows formed by the formation can trap gases and in effect function as macrocells. The microcells or minicells of foamed synthetic resin or rubber material are not required in the mat, and the desired cushioning properties can be gained by nonfoamed slabs.

In an embodiment of the invention the two interengaging slabs are symmetrical to one another and can even be identical with an additional sheet of metal or synthetic resin provided on the underside of the body and having the elasticity and penetration resistance of the upper sheet.

Finally, we have found that it is advantageous to provide the underside of the body with projections constituted by a uniform array of unitarily formed studs. Here again this eliminates the need to use foamed synthetic resin and such studs, with spaces between them, can be provided in lieu of hollows within the body or in addition to such hollows.

BRIEF DESCRIPTION OF THE DRAWING

The above and other objects, features and advantages of the present invention will become more readily apparent from the following description, reference being made to the accompanying drawing in which.

SPECIFIC DESCRIPTION

Elastomerically supported rails for a track having sleepers are described in the commonly assigned copending applications Ser. No. 292,788 and Ser. No. 292,789, both filed Aug. 14, 1981. Reference may also be had to the commonly assigned U.S. Pat. No. 4,266,719 and the references cited therein.

Figure 5:
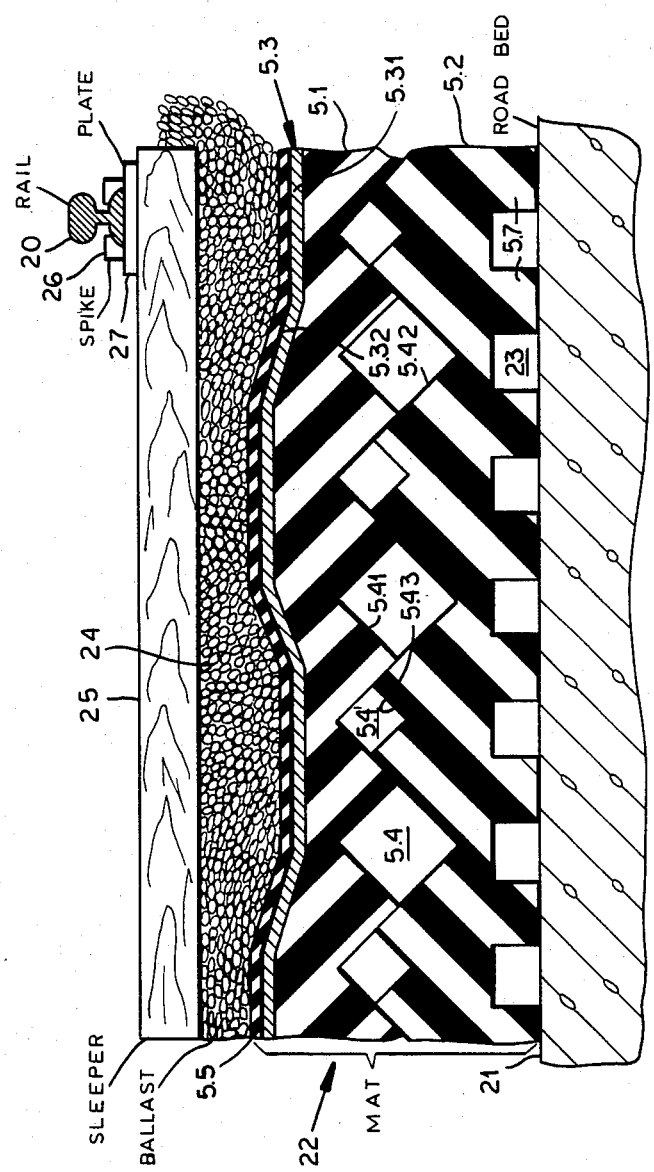
FIG. 5 is a section through a road bed for a railway track showing principles of the present invention.

Referring first to FIG. 5, which shows one side in section of a rail bed for a pair of rails, one of which is shown at 20.

Generally the road bed provides a graded support surface 21, which is fully formed by packed material, concrete or any other stabilized material, upon which a mat 22 is disposed. Any of the mats of FIGS. 1 through 4 can be used for this purpose and in the embodiment illustrated in FIG. 5, the mat comprises upper and lower slabs 5.1 and 5.2.

The lower slab 5.2 is mounted upon the surface 21 by projections 5.7 defining spaces 23 between them. The upper slab 5.1 is provided with a metal or synthetic resin sheet 5.3 whose hardness and elasticity is such that it cannot be penetrated by even the sharp edges of the ballast gravel 24 overlying this sheet.

The sheet 5.3 is provided with horizontal portions 5.31 between oppositely inclined flanks 5.32 which, in the manner previously described, transforms downwardly acting compressive forces into oppositely directed shear forces which balance and thus prevent shifting of the ballast.

Embedded within the ballast are the sleepers or ties one of which can be seen at 25 and the rails 20 can be anchored by spikes 26 through plates 27 to the sleeper 25. The sleeper-rail arrangements of the aforementioned copending applications can also be used.

The formations 5.41 of the upper slab 5.1 have a regular saw-tooth pattern while the formation 5.42 of the lower slab also have a saw-tooth pattern with each tooth indicated at 5.43. As a result, large cells 5.4 and small cells 5.4 are formed between the slabs.

In order to increase the resistance to shifting of the ballast still further, the upper sheet 5.3, which is comprised of a rust resistant metal such as copper, zinc, zinc-plated steel or aluminum, or is a synthetic resin such as a polycarbonate, nylon or rigid polyester, is provided with a rubber coating 5.5.

Figure 1:
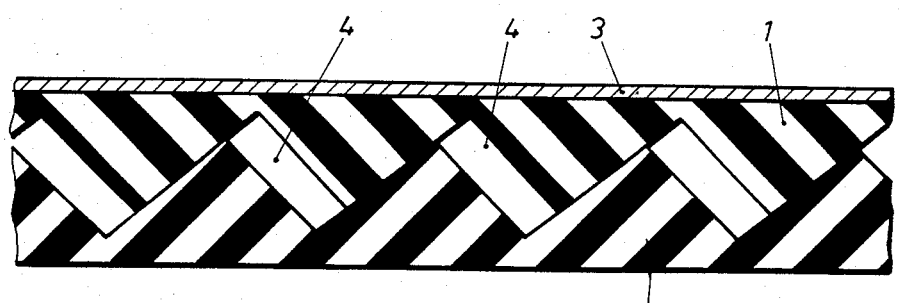
FIG. 1 is a vertical cross section through a mat embodying the invention and in which the elastomeric slabs or the upper and lower members of the body are virtually identical except for the presence of the penetration-resistant sheet on the upper slab.

From FIG. 1 it will be apparent that the mat can comprise an upper slab 1 and a lower slab 2, the upper slab being provided with the sheet 3 while the upper slabs have similar saw-tooth formations where they engage to define hollows 4 between the juxtaposed flanks.

Figure 2:
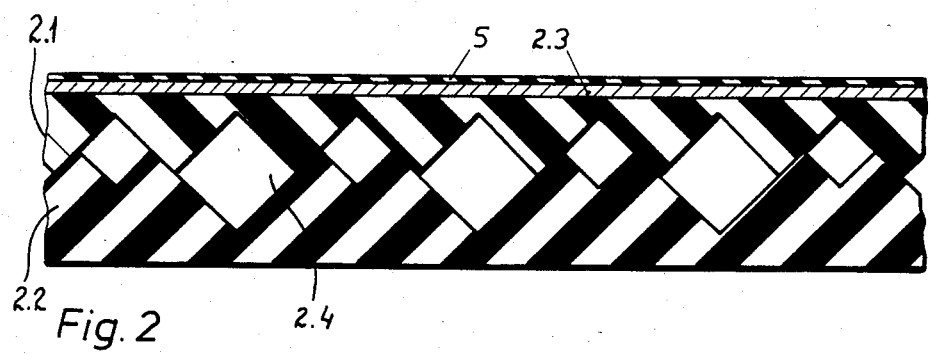
FIG. 2 is a similar section through another mat in which the interconnecting formations of the slabs are of different configurations.

The slabs 2.1 and 2.2 of the embodiment of FIG. 2 differ with respect to the formations defining the cells 2.4 (see FIG. 5) and the upper slab is here provided with the metal or plastic penetration-resistant coating 2.3 which is covered by the friction-increasing layer 5.

Figure 3:
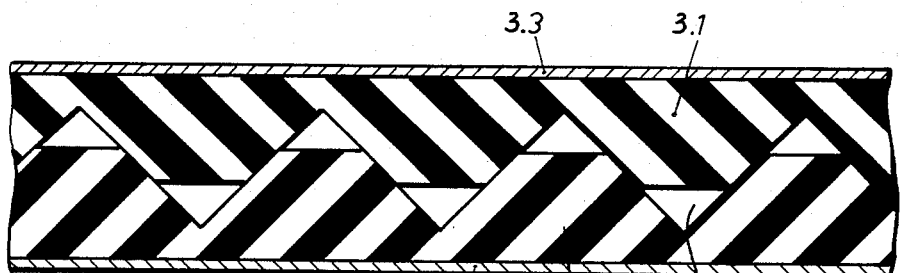
FIG. 3 is another vertical section through an embodiment in which the upper and lower slabs of the elastomeric body are identical.

In the embodiment of FIG. 3, the saw-tooth pattern of the slabs 3.1 and 3.2 is truncated so that the openings 3.4 are of triangular cross section. In this embodiment, slabs 3.1 and 3.2 are identical and have the aforementioned sheets 3.3 and 6 of synthetic resin material or metal respectively each of which can be coated by an elastomeric layer of high-frictional coefficient.

Figure 4:
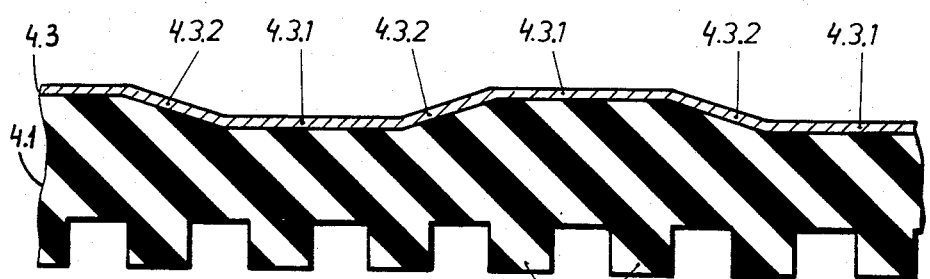
FIG. 4 is a vertical section through a single-body mat according to the invention.

In the embodiment of FIG. 4, the slab 4.1 is formed integrally with studs 7 and is covered by the metal or plastic layer 4.3 which can have horizontally extending portions 4.3.1 flanked by inclined portions 4.3.2 whose function has already been described.

We claim:

1. In a railway track bed having a support surface, at least one resilient mat on said surface for cushioning and sound-damping, a layer of ballast on said mat, at least one sleeper received in said layer of ballast and a rail mounted on said sleeper, the improvement wherein the upper surface of said mat is provided with a hard elastic sheet of metal vulcanized to the mat and preventing penetration of said ballast into said mat.

2. In a railway track bed having a support surface, at least one resilient mat on said surface for cushioning and sound-damping, a layer of ballast on said mat, at least one sleeper received in said layer of ballast and a rail mounted on said sleeper, the improvement wherein the upper surface of said mat is provided with a hard elastic sheet preventing penetration of said ballast into said mat, said mat comprising a pair of slabs of elastomeric material having interfitting formations defining hollows between said slabs and oriented so as to transform compressive force upon said mat into shear forces between said slabs.

3. The improvement defined in claim 2 wherein said sheet is formed with horizontal sections flanked by inclined sections and restricting movement of said ballast on said mat.

4. The improvement defined in claim 2 wherein said sheet is provided with a layer of a material of high frictional coefficient to limit movement of said ballast on said mat.

5. The improvement defined in claim 2 wherein said slabs are symmetrical to one another.

6. The improvement defined in claim 2 wherein the underside of said mat is provided with another corresponding sheet.

7. The improvement defined in claim 2 wherein said mat is formed with an array of uniform projections on its underside on which the mat is supported.

8. A mat adapted to support a layer of ballast in a railroad track bed, said mat comprising a body of elastomeric material overlain by a metal sheet bonded to said body and forming a barrier to penetration by said ballast, said body comprising a pair of slabs having interfitting formations shaped to transform compressive force on said mat into shear forces between said slabs and defining hollows between them.

9. The mat defined in claim 8 wherein said sheet has horizontal portions flanked by inclined portions.

10. The mat defined in claim 8 wherein said sheet is formed with a rubber layer increasing the coefficient of friction of said sheet to a sliding movement of said ballast.

11. The mat defined in claim 8 wherein the underside of said body is provided with a multiplicity of integral formations for supporting said mat upon a surface.

* * * * *